Jan. 20, 1959
G. J. PIEROTTI
2,870,066
CONDENSATION AND SEPARATION PROCESS
Filed Aug. 1, 1956
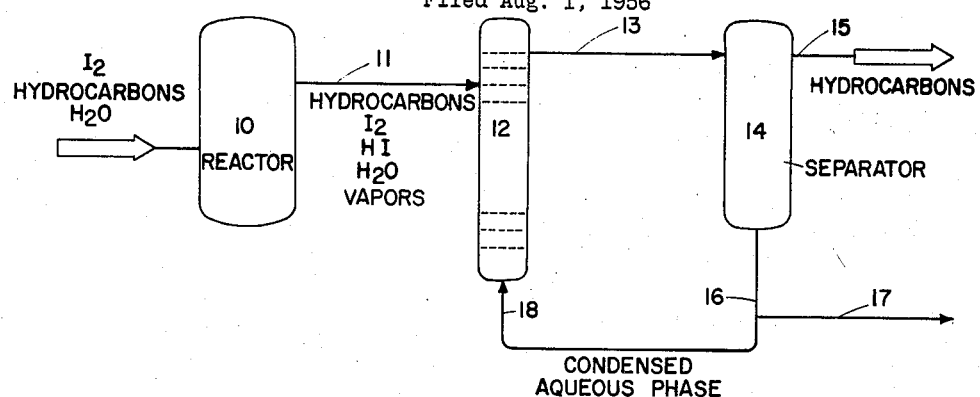
FIG. I
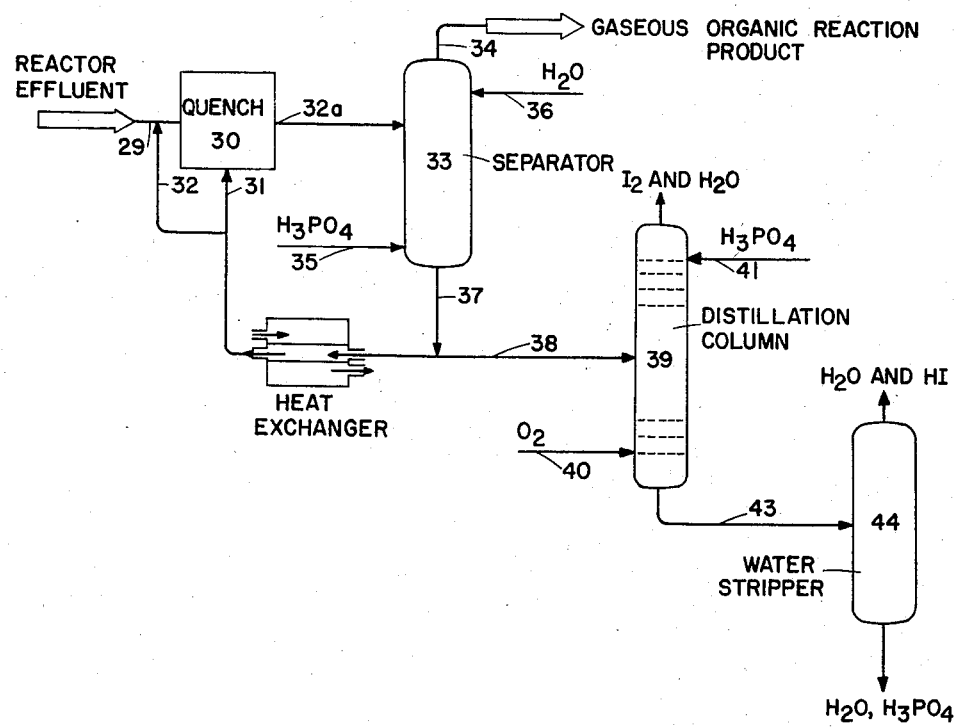
FIG. II
INVENTOR
GINO J. PIEROTTI
BY *William H. Myers*
THEIR AGENT 2,870,066

CONDENSATION AND SEPARATION PROCESS

Gino J. Pierotti, El Cerrito, Calif., assignor to Shell Development Company, New York, N. Y., a corporation of Delaware Application August 1, 1956, Serial No. 601,570

2 Claims. (Cl. 202—57)

This invention relates to an improved process for the treatment of aqueous mixtures of iodine and hydrogen iodide.

Aqueous mixtures of iodine and hydrogen iodide (either gaseous or liquid) may be used for the preparation of unsaturated hydrocarbons from saturated hydrocarbons. This process is an example of the use of aqueous mixtures of elemental iodine together with hydrogen iodide. Such aqueous mixtures are, however, useful for other conversions of organic compounds. Normally, these conversions are conducted at temperatures from 200 to 1100° C., resulting in gaseous mixtures of a highly corrosive nature.

One of the features in a cyclic process involving the use of iodine and hydrogen iodide comprises their recovery from their aqueous mixtures and their re-use in the conversion of further quantities of the same chemicals. For example, in the dehydrogenation of lower molecular weight hydrocarbons, an economical process requires the conversion of hydrogen iodide to iodine, the use of iodine in the dehydrogenation of the hydrocarbon, thus forming further quantities of hydrogen iodide which again must be converted to elemental iodine for re-use in the process. In addition to this conversion step, it is necessary to isolate iodine and hydrogen iodide from water so as to maintain optimum concentrations of these two materials relative to water as well as to hydrocarbon in a recycling process. The problem is further complicated by the fact that hydrogen iodide forms a constant boiling mixture with water at about 57% concentration, and at this point water distills overhead together with hydrogen iodide. It is desirable, of course, to effect a clean separation of water from iodine and hydrogen iodide, but heretofore this has not been practical or economical.

One of the serious problems encountered in utilization of such aqueous systems, hydrocarbons or other organic compounds comprises the extremely high rate of corrosion of most metallic equipment at the temperatures encountered during conversion and recovery of the products and by-products of the system.

It is an object of the present invention to improve the processes of handling aqueous mixtures containing high concentrations of elemental iodine and hydrogen iodide. It is a particular object of this invention to reduce the corrosion encountered during such processes. Other objects will become apparent during the following description of the invention.

Now, in accordance with the present invention, it has been found that by the addition of substantial quantities of phosphoric acid, e. g. in excess of 2.5% by weight of the total aqueous phase (including both gaseous and liquid states), the corrosion encountered, particularly during the use and handling of aqueous mixtures of hydrogen iodide and iodine, can be substantially reduced. More particularly, the addition of appreciable quantities of phosphoric acid during the quenching of gaseous aqueous compositions containing hydrogen iodide and iodine effects a profound reduction in the corrosion rate previously referred to. A preferred version of the present invention comprises the use of phosphoric acid during the quenching of such aqueous mixtures and wherein the metallic surfaces confining the aqueous mixtures referred to comprise metals containing no more than about 7.5% of iron, but being constituted of at least about 45% by weight of nickel, at least 15% by weight of chromium and at least 15% by weight of molybdenum, all as discussed more fully hereinafter.

Another aspect of this invention comprises the use of a sufficient proportion of phosphoric acid in an aqueous mixture of hydrogen iodide and water to not only depress corrosion of metallic surfaces confining the mixture but also to promote the fractional distillation of iodine and hydrogen iodide while at the same time repressing the distillation of water at a given fractional distillation temperature.

Aqueous mixtures of hydrogen iodide and iodine comprising at least about 2% by weight (usually 15-30%) each of elemental iodine, hydrogen iodide and water are intensely corrosive toward such normally resistant metals as steel and the like which contain more than about 7.5% by weight of iron, particularly if the temperature at which such mixtures are contacted with the metals is in excess of about 100° F.

In accordance with one aspect of the present invention, the very substantial reduction in the corrosion rate of confining metal surfaces is preferably effected by contacting hot compositions comprising an aqueous mixture having the high concentrations of iodine and hydrogen iodide previously referred to with a sufficient amount of phosphoric acid in an aqueous medium to reduce the temperature of the hot iodine-iodide mixture to about the boiling point of water or no higher than about 250° F. This is readily accomplished by contacting a sufficient amount of an essentially liquid phosphoric acid-containing aqueous mixture (optionally also containing iodine and/or hydrogen iodide) so as to reduce the temperature of the iodine-iodide mixture to below this point, utilizing a sufficiently cold phosphoric acid contacting phase.

A typical example of such an operation comprises the quenching of a reactor effluent, said effluent comprising hydrocarbons, water, elemental iodine and hydrogen iodide being at temperatures in the order of 900–1200° F. The quench is carried out by contacting of such an intensely heated reactor effluent with a sufficient amount of liquid aqueous phosphoric acid having a temperature of 100–200° F. that the quenched mixture enters a phase separator at a temperature between about 200 and 250° F. In the phase separator the hydrocarbons are removed overhead as a gas, while the aqueous mixture of hydrogen iodide, elemental iodine, water and phosphoric acid are at least partially recycled for a further quenching operation with additional quantities of the reactor effluent. In the absence of phosphoric acid, this quenching operation results in rapid and disastrous corrosion of the equipment being contacted. The use of stainless steel or other normally corrosion resistant metals proved to be ineffectual, corrosion rates being extremely high especially under the high temperatures to which the equipment was subjected.

Following the use of the phosphoric acid mixture as a quenching medium and subsequent passage through the phase separator (if any component of the resulting mixture is to be separated therefrom), the iodine-iodide-phosphoric aqueous mixture may be conducted to a regeneration zone, wherein hydrogen iodide is converted by oxidation to elemental iodine. Subsequent to this reconversion to elemental iodine, iodine and hydrogen iodide can be separated from aqueous phosphoric acid, Normally this is done by distillation methods, but, due to the constant boiling mixture of water and hydrogen iodide which occurs at about 57% by weight of hydrogen iodide in the absence of phosphoric acid, it is normally difficult to separate water from the mixture beyond this point. The presence of phosphoric acid in amount greater than about 50% by weight, based on the water present, alters the phase diagram characteristics in such a way that water remains in the bottoms while substantially pure mixture of iodine and hydrogen iodide passes overhead in a distillation column. Phosphoric acid stays in the bottoms together with water and minor proportions of hydrogen iodide. It is normal practice thereafter to subject the phosphoric acid and water to a fractional distillation for the purpose of removing a substantial amount of water still present.

In order to cause the alteration desired in the boiling characteristics of mixtures comprising phosphoric acid, water, iodine and hydrogen iodide, it is preferred that the proportion of phosphoric acid be greater than about 50% by weight and preferably within the range from about 60 to about 90% by weight, based on the total mixture being distilled. Consequently, it will be seen that phosphoric acid in such a process performs a dual role, namely, initially reducing the severe corrosion which normally occurs in hot aqueous mixtures of elemental iodine and hydrogen iodide and, secondly, in enabling the ready separation of iodine and hydrogen iodide from the aqueous medium.

The intermediate oxidation step wherein hydrogen iodide is converted to iodine is optional and will depend upon the utilization of the aqueous system of iodine and hydrogen iodide. This conversion to elemental iodine is desirable where the aqueous composition is employed for the dehydrogenation of hydrocarbons, particularly, low molecular weight hydrocarbons.

Phosphoric acid appears to perform a further function in the oxidation step, namely, exerting a catalytic effect on the rate and extent of conversion of hydrogen iodide to iodine. This is especially pronounced if the oxidation is conducted simultaneously during one of the distillation procedures just described.

Referring now to the appended drawing, a typical system of apparatus is illustrated. However, it will be understood that this is for the purpose of discussion and illustration only and that the process covered by the present invention is not to be limited thereto. According to Fig. I, it will be seen that vaporized aqueous mixtures of hydrogen iodide and elemental iodine together with hydrocarbons (either converted or unconverted) are emitted from reactor 10 through line 11. The vaporized mixture passes into a quenching zone 12 wherein a liquid aqueous phase comprising water, hydrogen iodide, iodine and phosphoric acid is introduced in a sufficient proportion to quench the inorganic components of the vaporized mixture from reactor 10 to an at least partially liquid condition, the remaining components, including hydrocarbons, remaining in the vaporized state. The quenched mixture passes from the quenching zone 12 through line 13 to a separator 14 wherein hydrocarbons are removed as a vapor phase overhead through line 15. The condensed aqueous phase comprising water, phosphoric acid, hydrogen iodide, and elemental iodine is removed from the lower part of the separator equipment through line 16 and is either sent to recovery and separation zones through line 17 or is recycled to the quenching zone 12 through line 18.

Under the conditions preferred, the quenching apparatus 12, lines 13, 16, 17, 18 and separator 14 are at least lined on their interior surfaces which are in contact with the liquid or vapor mixture referred to with the low iron content metals described previously. A preferred type of such metal is known commercially as "Hastelloy C." Hastelloy C is an alloy containing 4.5-7% iron, 4-5% tungsten, 16-8% molybdenum, 16-17% chromium, .1-1% each of silicon, manganese, vanadium and carbon, the balance of the composition being nickel.

Fig. II represents an integrated process embodying the multiple features of the present invention, namely, the use of phosphoric acid in aqueous mixtures of iodine and hydrogen iodide to prevent corrosion and also the use of the same acid for altering the distillation characteristics of the aqueous mixture so that iodide and iodine may be separated from water.

According to Fig. II, a reactor effluent comprising the aqueous mixture referred to above together with organic compounds previously treated by the mixture of iodine and hydrogen iodide, are transmitted in vaporized form through line 29 to a quench zone 30. The gaseous reactor effluent is quenched either prior to or in the quench zone by a relatively colder condensed aqueous phase contacted with the effluent through line 32, which may either connect with line 21 as shown or directly with the quench zone 30. The quenching liquid contacted with the reactor effluent may be the relatively colder condensed mixture derived from the quench zone, the quenching liquid being added to the reactor effluent in an amount sufficient to at least partially condense the aqueous phase while leaving the organic components of the reactor effluent in substantially gaseous condition.

The quenched mixture is passed through line 32a to separator 33, wherein the gaseous organic reaction products are separated overhead by means of line 34. Water may be added if desired in the separator or into the quench zone by means of line 36, phosphoric acid being injected into the system, for example, in through line 35. The injection of phosphoric acid at this point reduces drastically the corrosion which normally occurs in the quench and separator recycle loop, the condensed bottoms product comprising substantially the aqueous phase being withdrawn from the separator through line 37. This condensed aqueous phase is sent either to a recovery zone or is recycled to the heat exchanger 37a for quenching further quantities of the reactor effluent, as previously described.

If the aqueous phase is sent to recovery, such as through line 38, it may be conducted to a fractional distillation column 39 designed to take at least iodine and, preferably, iodine and hydrogen iodide overhead through line 42. If it is desired to remove as vapors both iodine and a majority of the hydrogen iodide, leaving behind as a bottoms product only the water, phosphoric acid, and a minor proportion of hydrogen iodide, then further quantities of phosphoric acid are preferably added in the distillation column, such as through line 41. Simultaneously, of course, oxygen may be added to the distillation column as in line 40 or a substantially inert gas may be used. If oxygen or another oxidizing agent (such as hydrogen peroxide) is injected into the distillation column, this will cause conversion of hydrogen iodide to elemental iodine. The use of substantially inert gaseous diluents, such as nitrogen and the like, will facilitate removal of iodine overhead from the system.

In accordance with an important phase of the present invention, the injection of relatively large amounts of phosphoric acid into the system as described, such as through line 41, radically changes the relative volatilities of the components present, reducing the volatility of water and increasing the volatility of iodine and hydrogen iodide at any given fractional distillation temperature. Under these conditions and when the phosphoric acid content is maintained at least above 50% by weight, based on the total aqueous mixture, hydrogen iodide and iodine will distill overhead, the bottoms product comprising substantially all of the water present in the original mixture together with phosphoric acid and minor amounts of hydrogen iodide, leaving the distillation column such as through line 43. This then passes to the water stripper 44 wherein water is removed overhead, the bottoms product comprising a concentrated solution of phosphoric acid.

The examples which follow illustrate the operation of the present invention. The fluid tested comprised 37% by weight of hydrogen iodide, 23% by weight of elemental iodine, the remainder being either water or water and phosphoric acid. The corrosiveness of this fluid was tested under either dynamic or stagnant conditions in the presence of either air or nitrogen atmosphere at 150° F. for 24 hours. In the absence of any phosphoric acid in the system, the medium caused a corrosion rate of Hastelloy C specimens in the order of 160 mils per year. The addition of 2% phosphoric acid, based on the total fluid, reduced this corrosion rate to 90 mils per year, while the addition of 10% phosphoric acid resulted in an improved corrosion rate of about 11 mils per year. A medium comprising 28.6% hydrogen iodide, 17% elemental iodine, 25.6% phosphoric acid and 28% water resulted in a corrosion rate of Hastelloy C metal in the order of 5 mils per year. Under these same conditions, it was found that stainless steel and other high iron alloys still corroded at a high rate.

When a reactor effluent comprising butane, butylene and butadiene, together with a vaporized mixture of 37% hydrogen iodide, 23% elemental iodine and 40% water, the entire effluent having a temperature of about 1045° F., is quenched by direct contact with a liquid aqueous solution of hydrogen iodide and iodine to a temperature of about 220° F., an exceedingly high rate of corrosion of Hastelloy C and other alloy metals occurs. However, when phosphoric acid is introduced into the quench liquid in an amount of about 10% by weight thereof, the corrosion of the quench vessel and fittings connected thereto is reduced to a low level.

In a typical process involving the apparatus described in Fig. II, the effect of phosphoric acid upon the relative volatilities of the components of the aqueous phase was investigated over a range from 0% to 75% by weight phosphoric acid, based on the aqueous phase. The aqueous phase comprised 33% by weight of water, 36% by weight of iodine and 31% by weight of hydrogen iodide. This mixture was distilled using a distillation column having about 1 theoretical plate. When no phosphoric acid was present in the system, the overhead stream contained about 0.25% by weight of iodine for every part by weight of water. The overhead stream also contained approximately 57.3% by weight of hydrogen iodide, based on the water coming overhead. When phosphoric acid was mixed with this system in amounts varying from 40 to 75%, based on the total mixture being distilled, the ratio of iodine to water and of hydrogen iodide to water drastically changed, as will be seen by Table I which follows:

Table I

| Percent $H_3PO_4$ | Alpha Value [1] | HI in HI—$H_2O$ Azeotrope ($H_3PO_4$-free basis) |
|---|---|---|
| 0 | 0.25 | 57.3 |
| 40 | 1.2 | 53.0 |
| 60 | 5 | 45 |
| 75 | 20 | 27.5 |

[1] Alpha value = $\dfrac{\text{Mol fraction of } I_2 \text{ in vapor} / \text{Mol fraction of } I_2 \text{ in bottoms}}{\text{Mol fraction of } H_2O \text{ in vapor} / \text{Mol fraction of } H_2O \text{ in bottoms}}$ In accordance with this particular phase of the present invention, it is preferred that the proportion of phosphoric acid be maintained within the range from about 50% to about 90%, based on the total aqueous mixture of water, iodine and hydrogen iodide. For the purpose of virtually suppressing corrosion of metallic confining surfaces, however, the proportion of phosphoric acid is substantially smaller (but at least about 2.5% by weight) than the range necessary for alteration in relative volatilities of the components of the aqueous phase. The corrosion-inhibiting proportions of phosphoric acid have been discussed in detail hereinbefore.

We claim as our invention:

1. In the process of separating iodine and hydrogen iodide from an aqueous mixture comprising water, elemental iodine and hydrogen iodide, wherein iodine and major proportions of hydrogen iodide are fractionally distilled and water and minor proportions of hydrogen iodide remain as a bottoms product, the improvement comprising conducting the distillation in the presence of more than about 50% by weight, based on the aqueous mixture, of phosphoric acid whereby the proportion of iodine and hydrogen iodide relative to water in the overhead distillation fraction is substantially increased.

2. A process according to claim 1 wherein the phosphoric acid is present in an amount between about 60% and 90% by weight of the aqueous mixture.

References Cited in the file of this patent

UNITED STATES PATENTS

| 1,572,354 | Glavell | Feb. 9, 1926 |
| 1,995,954 | Albrecht | Mar. 26, 1935 |
| 2,413,205 | Word et al. | Dec. 24, 1946 |
| 2,568,889 | Hanson et al. | Sept. 24, 1951 |